(12) United States Patent
Steele

(10) Patent No.: US 7,854,122 B2
(45) Date of Patent: Dec. 21, 2010

(54) COOLING METHOD AND APPARATUS

(75) Inventor: David Steele, Bristol (GB)

(73) Assignee: Rolls-Royce, PLC, London (GB)

( * ) Notice: Subject to any disclaimer, the term of this patent is extended or adjusted under 35 U.S.C. 154(b) by 1087 days.

(21) Appl. No.: 11/488,071

(22) Filed: Jul. 18, 2006

(65) Prior Publication Data

US 2007/0036942 A1    Feb. 15, 2007

(30) Foreign Application Priority Data

Aug. 11, 2005   (GB) ................... 0516460.3

(51) Int. Cl.
*F02C 1/00*     (2006.01)
(52) U.S. Cl. .......................... 60/752; 60/754
(58) Field of Classification Search ........... 60/752–766, 60/770
See application file for complete search history.

(56) References Cited

U.S. PATENT DOCUMENTS

| | | | |
|---|---|---|---|
| 3,990,837 A | 11/1976 | Snell | |
| 4,136,516 A | 1/1979 | Corsmeier | |
| 5,027,604 A | 7/1991 | Krueger | |
| 5,181,379 A * | 1/1993 | Wakeman et al. | 60/766 |
| 5,465,572 A * | 11/1995 | Nicoll et al. | 60/266 |
| 6,339,879 B1 * | 1/2002 | Wheat et al. | 29/889.721 |
| 6,408,610 B1 * | 6/2002 | Caldwell et al. | 60/782 |
| 6,623,790 B2 * | 9/2003 | Fernihough et al. | 427/140 |
| 7,216,485 B2 * | 5/2007 | Caldwell et al. | 60/772 |
| 2004/0226682 A1 | 11/2004 | Ehrhard et al. | |
| 2005/0198940 A1 * | 9/2005 | Koshoffer et al. | 60/204 |

FOREIGN PATENT DOCUMENTS

EP    1 416 225 A1    5/2004

* cited by examiner

*Primary Examiner*—Michael Cuff
*Assistant Examiner*—Gerald L Sung
(74) *Attorney, Agent, or Firm*—Oliff & Berridge, PLC

(57) ABSTRACT

Apparatus for adaptive cooling comprising a first component having at least one aperture extending therethrough with a sacrificial component positioned within the at least one aperture. The first component is operable at a maximum duty temperature and the sacrificial component has a melting or sublimation point below the maximum duty temperature of the first component. The sacrificial component defines an effective aperture the size of which may be increased if, in use, the sacrificial component is subjected to a temperature between the melting or sublimation point of the sacrificial component and the maximum duty temperature of the first component.

13 Claims, 3 Drawing Sheets

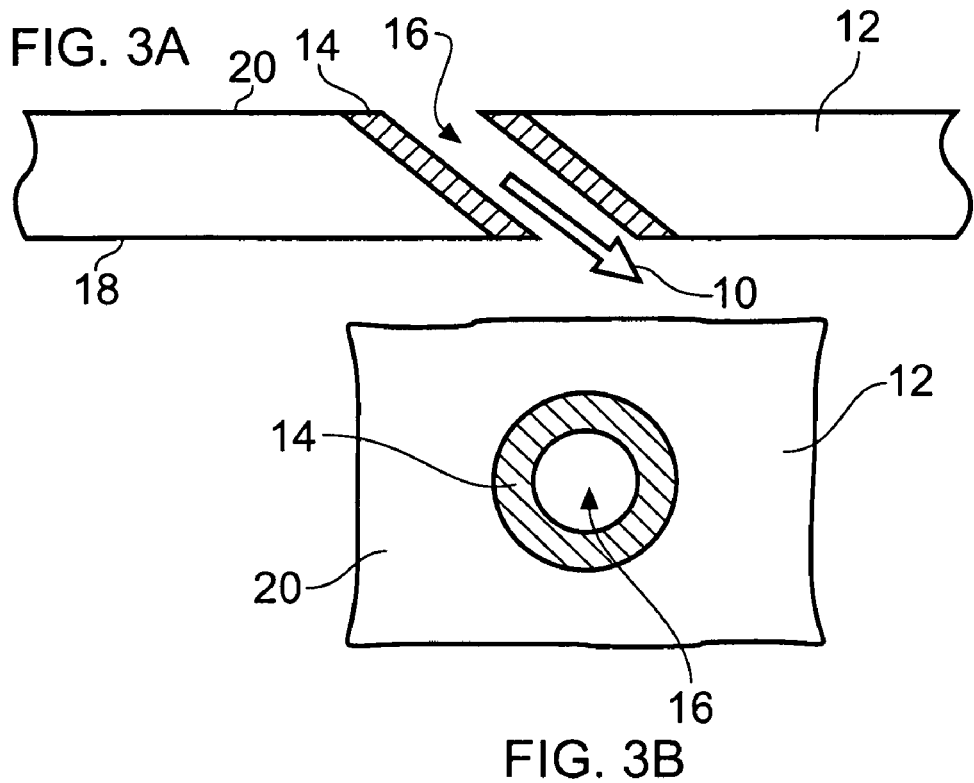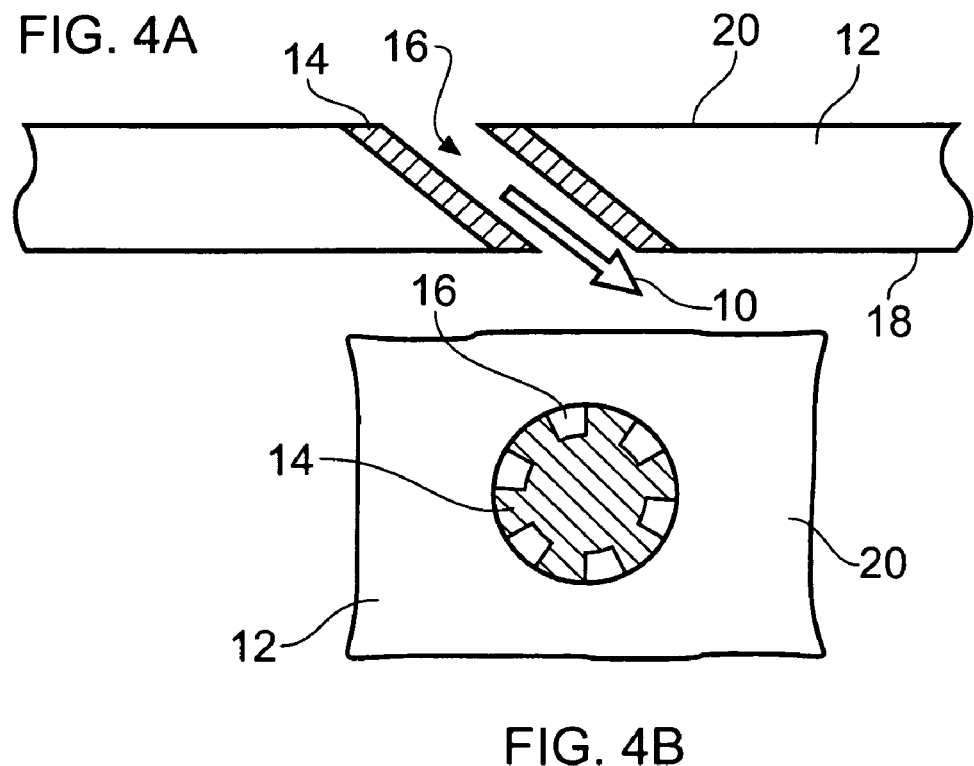

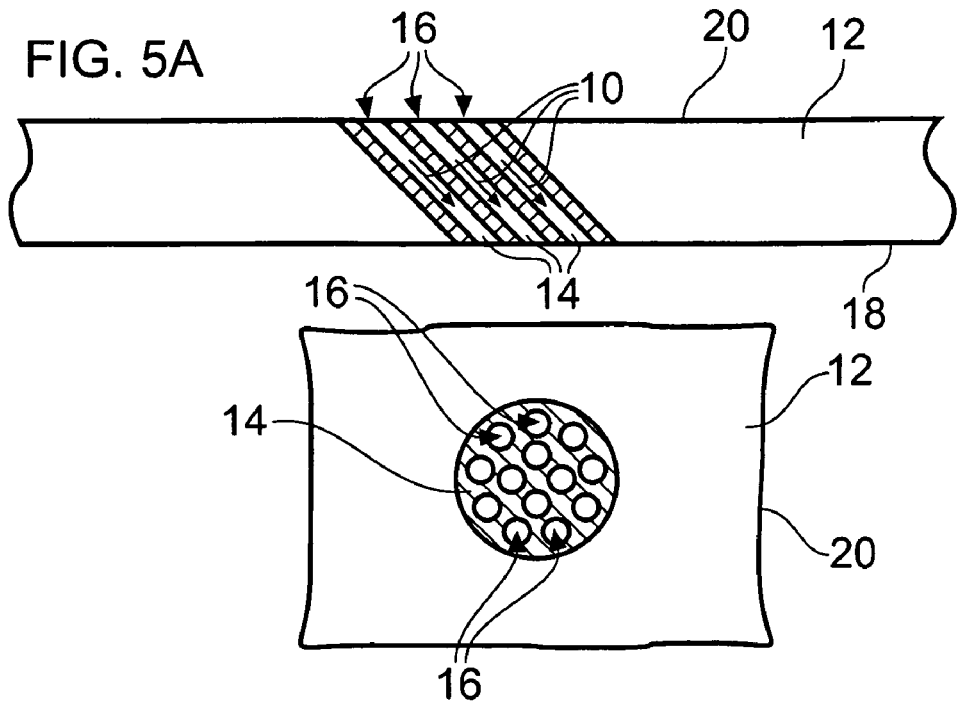
FIG. 5A
FIG. 5B
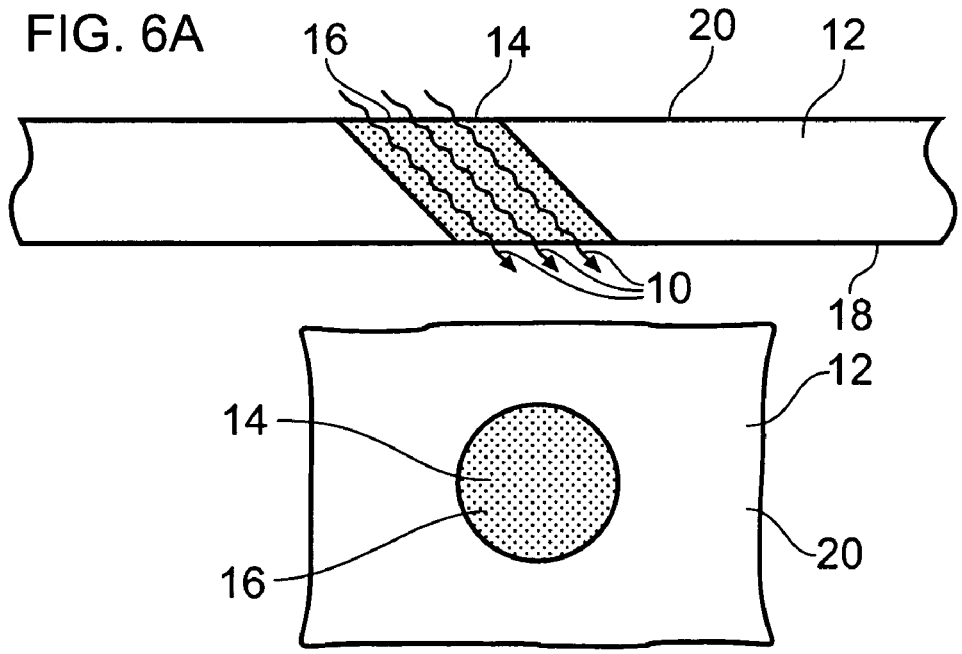
FIG. 6A
FIG. 6B

COOLING METHOD AND APPARATUS

This invention concerns a method and apparatus for adaptive cooling.

In particular it concerns a method and apparatus for adaptive cooling of a duct wall, such as the wall of a combustor, afterburner or exhaust duct of a gas turbine engine.

Gas turbine engines for air, land or marine vehicles, and for energy generation typically comprise, in axial flow series, a compressor, a combustor, a turbine and occasionally, for certain applications, an afterburner.

Air enters the engine and is compressed within the compressor before fuel is added to the air flow and ignited within the combustion chamber. The hot gas drives a turbine, which powers the compressor. Excess energy is extracted as work from the turbine or used to generate thrust in the aircraft application. To generate additional thrust it is possible to inject and ignite further fuel in an afterburner. Ultimately the hot gas is expelled to the environment via an exhaust duct.

The temperature of the air entering the turbine has a bearing on the efficiency of the turbine. To this end it is desirable to run the turbine at as high a temperature as possible—often in excess of 1000° C. To enable operation at these high temperatures it is necessary to cool the walls of the combustion chamber, the wall of the afterburner (commonly referred to as a heatshield) or the wall of the exhaust duct to prevent their damage.

One known method is film cooling. Metering, or "effusion cooling", holes that extend through the thickness of the components wall allow relatively cool cooling air to enter the combustor, afterburner and/or exhaust duct. The air forms a protective film on the inner surface of the wall. The film is continually replenished with fresh, cold air.

To ensure adequate cooling for the entire surface it is necessary to provide a multiplicity of holes with diameters between 0.4 and 0.7 mm.

Due to the large number of holes and their small size, significant variations in total area and hence flow and cooling effectiveness can arise. Consequently, great attention is paid to the drilling of the holes, and in some cases flow tests are carried out as part of the inspection process. This can add a large overhead in terms of both time and cost.

Periodic features in the combustor can also give rise to variation in the heat load applied to the wall. It is difficult, and hence not practical, to vary hole size or pitching in a circumferential direction. To counter this, the holes are formed such that the regions of highest heat load are effectively cooled and this results in excessive cooling for areas presented with a lower heat load.

The local excess of cooling exacerbates thermally induced stresses in the component and reduces the overall efficiency of the gas turbine by diverting air which could otherwise be used for combustion.

The configuration of the cooling holes is fixed and cannot respond to conditions arising from faults or partial failures of other components. These conditions can manifest as significantly different heat-load to that for which the component was validated. For example, the engine may be subjected to a bird-strike or ingest other debris during operation which can obstruct some cooling features and detrimentally adjust the heat distribution within an effusion cooled component.

It is an object of the present invention to seek to provide an improved method and apparatus to seek to address these and other problems.

According to the present invention there is provided apparatus for adaptive cooling comprising a first component having at least one aperture extending therethrough, the first component operable at a maximum duty temperature;

a sacrificial component having a melting or sublimation point below the maximum duty temperature of the first component and positioned within the at least one aperture;

wherein the sacrificial component defines an effective aperture the size of which may be increased if, in use, the sacrificial component is subjected to a temperature between the melting or sublimation point of the sacrificial component and the maximum duty temperature of the first component.

The first component may have opposing faces, the first face being adapted to lie adjacent a hot area having a temperature T1, the second face being adapted to lie adjacent a cold area having a temperature T2, wherein T1>T2.

The effective apertures are arranged to permit a flow of coolant from the cold area to the hot area.

The apertures or effective apertures are perpendicular to the first face, or may be angled with respect to the first face.

Preferably the sacrificial component is a coating, which may be formed by electroplating, dipping, spraying, precipitation from gaseous phase reactants, painting, condensation.

Preferably the first component is the wall of a combustion chamber, which may be the combustion chamber of a gas turbine, or afterburner of a gas turbine. Alternatively the first component may be the wall of an exhaust duct for a gas turbine engine or other internal combustion engine.

According to a second aspect of the present invention there is provided a method of adaptive cooling, the method comprising the steps providing a first component having at least one aperture extending therethrough, the first component operable at a maximum duty temperature;

providing a sacrificial component having a melting or sublimation point below the maximum duty temperature of the first component and positioned within the at least one aperture, thereby defining an effective aperture;

applying heat such that the temperature of the sacrificial component is raised to a temperature between its melting or sublimation point and the maximum duty temperature of the first component wherein the effective aperture increases in size.

Preferably the method further comprises the step of passing a flow of coolant through the effective aperture. Preferably, as the effective aperture increases in size the temperature of the sacrificial component is reduced by the flow of coolant to a temperature below the melting or sublimation point of the sacrificial component.

The first component may be the wall of a combustion chamber, which may be a gas turbine combustion chamber, or afterburner of a gas turbine. Alternatively the first component may be the wall of an exhaust duct for a gas turbine engine or other internal combustion engine. Preferably the coolant is air.

Embodiments of the present invention will now be described by way of example only and with reference to the accompanying drawings, in which:

FIG. 3A is an alternative embodiment to that shown in FIG. 2, where a sacrificial component is provided as an annular insert;

FIG. 3B is a plan view of the embodiment presented in FIG. 3A;

FIG. 4A is an alternative embodiment of the present invention, where a sacrificial component is provided as a grooved insert;

FIG. 4B is a plan view of the embodiment presented in FIG. 4A;

FIG. 5A is an alternative embodiment of the present invention where a sacrificial component is provided as a perforated insert;

FIG. 5B is a plan view of the embodiment presented in FIG. 5A;

FIG. 6A is an alternative embodiment of the present invention where a sacrificial component is provided as a porous insert; and FIG. 6B is a plan view of the embodiment presented in FIG. 6A.

Figure 1:
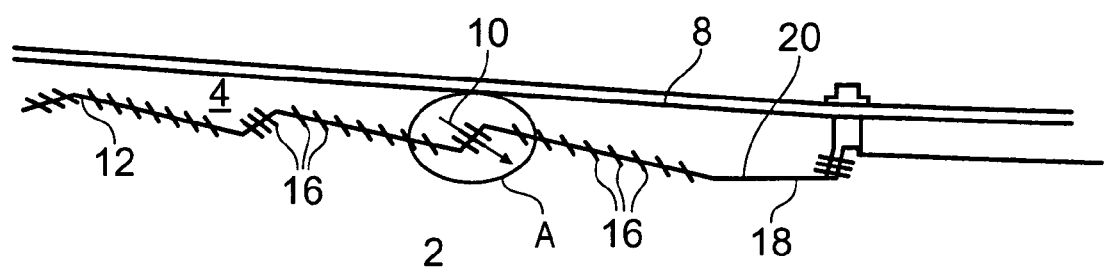
FIG. 1 depicts a gas turbine afterburner heatshield according to the present invention.

FIGS. 1 to 6B show a heatshield wall 12 mounted to a casing 8 in a gas turbine engine. The heatshield wall 12 has a first face 18 and a second face 20. The wall also has apertures 16 that allow air (depicted as arrow 10) to pass from a relatively cold area 4 (area adjacent to the second face 20) into the combustion chamber 2 (area adjacent to the first face 18).

The apertures 16 are produced to a uniform size of greater diameter than that calculated to supply an adequate flow of air for cooling the wall at the normal operating temperature of the heatshield. The apertures may be formed by ablation with a laser.

The apertures 16 are arranged at an angle to the face of the wall adjacent the combustion chamber to allow the flow of air through the aperture to provide a robust film on that face. The heatshield wall which defines the combustor 2 has a maximum duty temperature of about 950° C.

Figure 2:
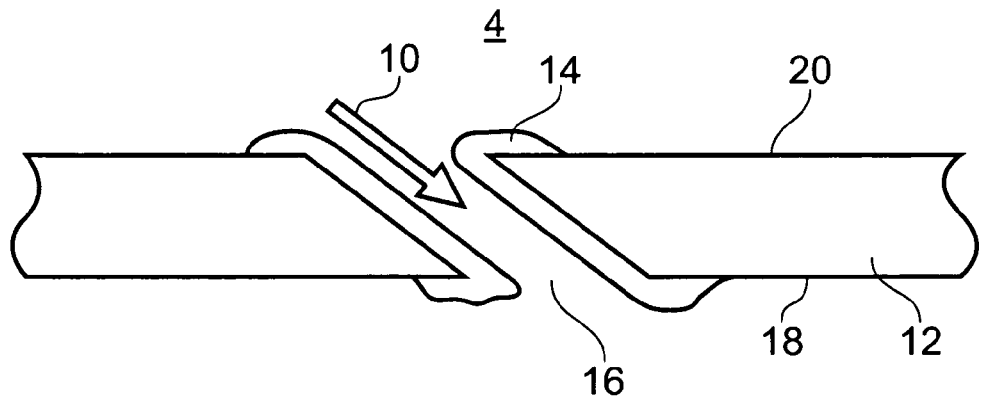
FIG. 2 is an enlarged image of the encircled area A of FIG. 1.

Turning now to FIG. 2 specifically, a sacrificial component 14 in the form of a coating is applied to the apertures 16 at the entrance, exit, and/or within the bore of the aperture 16 to provide an effective aperture that passes a lesser amount of air to that passed by the uncoated aperture.

The coating 14 has a melting or sublimation point below the maximum duty temperature of the heatshield wall. The coating 14 forms an obstruction that reduces the flow area of the aperture and consequently the mass flow rate of coolant fluid.

If, in use, the local temperature rises to a temperature at or above the melting or sublimation point of the coating 14 then a proportion of the coating 14 is removed. The effective aperture and the flow area for the cooling flow is increased in size and this permits an increased cooling flow.

The increased cooling flow reduces the local temperature and maintains the temperature of the heatshield wall within the limits of its maximum duty temperature.

The coating 14 is preferably applied through an electroplating process. Beneficially, the sharp edges of the aperture 16 results in preferential deposition at the entrance and exit. The effective aperture area is achieved with a minimum of coating material 14 and this provides both a weight and cost benefit.

Where silver is used as the sacrificial component material the effective aperture size will begin to increase when the local temperature rises to around 950° C., this being the melting point of the silver. The effective aperture size may be modified at higher or lower temperatures depending on the choice of coating material. For example, if copper or gold, having melting points of 1080° and 1060° C. respectively, could be used to modify the aperture size at different temperatures to that of silver.

For applications other than combustion chambers or afterburners lead or tin may be used, which have melting points of 330° and 230° C. respectively. Such applications include, but are not limited to, an exhaust duct of a gas turbine engine or a duct of any device which is exposed to temperatures approaching the duty temperature of the duct material.

Sacrificial materials other than pure metals may also be used. These can be deposited using methods of application other than electroplating, such as dipping in molten material or plasma spray. Other types of refractory material could be deposited by precipitation from gaseous phase reactants. For low activation temperature, a polymer or paint-type material could be used; the polymer could be produced by reaction directly on the substrate; paint could be applied conventionally.

Alternatively, and as show in FIGS. 3A to 6B, the sacrificial component may be provided as a solid insert which is sized to fit in the aperture provided in the first component and manufactured from at least one of the materials described herein. The insert 14, that is to say the sacrificial component 14, is configured such that when inserted into the aperture 16 of the first component 12, the effective cross sectional area of the flow path through the aperture 16 is partially reduced. For example, in the case of an aperture 14 with a substantially circular cross-section the sacrificial component may be an annular sleeve as shown in FIGS. 3A and 3B. Alternatively it may be a cylindrical plug with axially extending grooves on the periphery of the plug which define a plurality of flow paths as shown in FIGS. 4A and 4B. In another embodiment the sacrificial component is provided with a plurality of perforations as shown in FIGS. 5A and 5B. In another embodiment the sacrificial component is a porous plug as shown in FIGS. 6A and 6B.

The proportion of flow increase achievable by the invention can be set by choice of hole size and the thickness of the sacrificial component, whether the sacrificial component is provided as a coating or an insert.

The diameters of cooling holes for high and low pressure combustion systems lie in the range Ø0.5-2.5 mm. For a diameter of Ø0.7, and an initial sacrificial component thickness of 0.15 mm, a maximum increase in the effective aperture and flow area by a factor of 3.1 would result if the entire sacrificial component is removed.

If desired, the sacrificial component may be removed and a new coating or insert provided during servicing to restore the combustor wall to its original state.

It will be appreciated that the invention offers a number of advantages. In particular, the wall of the first component can be protected from events in service that increase the local temperature to above the maximum duty temperature of the wall. The wall can be protected even if associated components fail or there is a loss of coolant pressure Additionally, the wall may be provided with an optimised cooling flow at the start of its life, which remains optimised during the life of the component as the cooling flow is automatically adjusted to respond to non-uniformity in the heat-load to the component.

In some circumstances the precise temperature profiles within a component, such as the combustor, afterburner or exhaust duct of a gas turbine engine, are not easily predicted, the invention allows the cooling flow of the component to be automatically adjusted.

Further, the invention allows the relaxation of manufacturing tolerances, as normally the nominal size of cooling holes is chosen to be larger than required to ensure that the resultant cooling hole size, even on its minimum tolerance, is still adequate. The saving of cooling flow will give thermodynamic advantages to the engine cycle e.g. by minimising coolant frictional losses, reducing work required to pressurise coolant, and in the case of an afterburner, releasing this flow to take part in the combustion process (giving higher-thrust boost).

The sacrificial component need not be as robust as the wall of the first component and may be selected for its melting/sublimation temperature. The first component provides rigidity and support for the sacrificial component. Consequently, for low activation temperature, a polymer or paint-type material could be used where the polymer could be produced by reaction directly on the substrate. Paint could be applied conventionally.

Various modifications may be made without departing from the scope of the invention.

For example, the apertures in the first component may be formed using a process other than ablation, including conventional techniques such as drilling, electro discharge machining, or as part of a casting process. Such processes can produce apertures of a lower tolerance which are modified through the addition of the sacrificial component to define the size of the effective aperture. The apertures can also be larger than those in current constructions because their size will be modified through the addition of the sacrificial component. Larger apertures are generally cheaper to produce than smaller apertures and consequently the cost of manufacture is reduced.

This system could be applied to any gas-turbine combustor or afterburner employing film cooling methods such as normal effusion, angled effusion, machined rings etc.

The invention claimed is:

1. Apparatus for adaptive cooling comprising a first component having at least one aperture extending therethrough, the first component operable at a maximum duty temperature;
   a sacrificial component having a melting or sublimation point below the maximum duty temperature of the first component and positioned within the at least one aperture;
   wherein the sacrificial component defines an effective aperture the size of which increases under the condition that the sacrificial component is subjected to a temperature between the melting or sublimation point of the sacrificial component and the maximum duty temperature of the first component;
   wherein the first component has opposing faces and the effective aperture is arranged to permit a flow of coolant from one of the opposing faces to another of the opposing faces, under the condition that the sacrificial component is subjected to a temperature below the melting or sublimation point of the sacrificial component;
   wherein the sacrificial component is disposed substantially uniformly within the at least one aperture and extends from one of the opposing faces to another of the opposing faces, and
   wherein the effective aperture is substantially concentrically disposed within the at least one aperture extending completely through the first component.

2. Apparatus according to claim 1, wherein the first face being adapted to lie adjacent a hot area having a temperature T1, the second face being adapted to lie adjacent a cold area having a temperature T2, wherein T1>T2.

3. Apparatus according to claim 2, wherein the effective apertures are arranged to permit a flow of coolant from the cold area to the hot area.

4. Apparatus according to claim 2, wherein the apertures are perpendicular to the first face.

5. Apparatus according to claim 2, wherein the apertures are angled with respect to the first face.

6. Apparatus according to claim 1, wherein the sacrificial component is a coating.

7. Apparatus according to claim 6, wherein the coating is formed by electroplating, dipping, spraying, precipitation from gaseous phase reactants, painting or condensation.

8. Apparatus according to claim 1 wherein the first component is a wall of a combustion chamber.

9. Apparatus according to claim 8, wherein the combustion chamber is a gas turbine combustion chamber.

10. Apparatus according to claim 8, wherein the combustion chamber is a combustion chamber in an afterburner.

11. Apparatus according to claim 1, wherein the first component is a wall of an exhaust duct.

12. A gas turbine engine comprising apparatus as claimed in claim 1.

13. Apparatus according to claim 1, wherein the maximum duty temperature is approximately 950° C.

* * * * *